(12) United States Patent
Krishnagi et al.

(10) Patent No.: US 12,353,314 B2
(45) Date of Patent: Jul. 8, 2025

(54) METHOD AND SYSTEM FOR AUTOMATED APPLICATION MANAGEMENT

(71) Applicant: JPMorgan Chase Bank, N.A., New York, NY (US)

(72) Inventors: Kumar Rao Krishnagi, Powell, OH (US); Nalini Sreeram Boda, Lewis Center, OH (US); Sharmila Prakash, Columbus, OH (US); Vijay Kumar Perla, Westerville, OH (US); Laxman Dongisharapu, Hyderabad (IN); Mark Alan Wells, Columbus, OH (US); Jerome Joseph, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 226 days.

(21) Appl. No.: 18/116,046

(22) Filed: Mar. 1, 2023

(65) Prior Publication Data

US 2023/0333957 A1    Oct. 19, 2023

(30) Foreign Application Priority Data

Apr. 13, 2022   (IN) .............................. 202211022178

(51) Int. Cl.
*G06F 11/34*   (2006.01)
*G06F 9/4401*  (2018.01)
*G06F 11/30*   (2006.01)

(52) U.S. Cl.
CPC ........ *G06F 11/3409* (2013.01); *G06F 9/4406* (2013.01); *G06F 11/3055* (2013.01); *G06F 2201/81* (2013.01)

(58) Field of Classification Search
CPC ........ G06F 11/34; G06F 9/4406; G04F 11/30; G04F 9/4401; G04F 11/3055; G04F 11/3409; G04F 2201/81
USPC ........................ 709/217, 218, 219, 223, 224
See application file for complete search history.

(56) References Cited

U.S. PATENT DOCUMENTS

| | | | |
|---|---|---|---|
| 6,813,733 B1 * | 11/2004 | Li ....................... | G06F 11/0748 714/38.14 |
| 7,925,635 B1 * | 4/2011 | Ravulur .............. | G06F 11/3423 705/52 |
| 8,909,305 B2 * | 12/2014 | Guedalia ............ | H04M 1/7243 455/574 |
| 9,632,824 B2 * | 4/2017 | Lyubinin ............ | G06F 21/31 |

(Continued)

FOREIGN PATENT DOCUMENTS

EP    1789877 A2 *  5/2007 ............. G06F 9/485

*Primary Examiner* — Sargon N Nano
(74) *Attorney, Agent, or Firm* — GREENBLUM & BERNSTEIN, P.L.C.

(57) ABSTRACT

A method for facilitating automated application management based on activity is disclosed. The method includes monitoring metrics that correspond to an application, the metrics including a network traffic metric; determining, for the application, whether the metrics satisfy a predetermined threshold, the predetermined threshold including an idle time threshold; deactivating the application when the corresponding metrics satisfy the predetermined threshold; receiving, from a client application, a request for the deactivated application; initiating a health check for the application in response to the request; and activating the application based on a result of the health check.

20 Claims, 7 Drawing Sheets

(56) References Cited

U.S. PATENT DOCUMENTS

| | | | | |
|---|---|---|---|---|
| 9,942,850 | B2* | 4/2018 | Wang | H04L 5/001 |
| 10,409,579 | B1* | 9/2019 | Morris | G06F 11/3055 |
| 2003/0231638 | A1* | 12/2003 | Huck | H04J 3/14 |
| | | | | 370/400 |
| 2007/0174716 | A1* | 7/2007 | Erdtmann | G06F 11/0715 |
| | | | | 714/39 |
| 2013/0019353 | A1* | 1/2013 | Liu | G01Q 60/42 |
| | | | | 850/50 |
| 2016/0026676 | A1* | 1/2016 | Qi | G06F 8/62 |
| | | | | 707/694 |
| 2016/0335111 | A1* | 11/2016 | Bruun | H04L 41/50 |
| 2017/0104608 | A1* | 4/2017 | Sergeev | H04L 49/3009 |

* cited by examiner

METHOD AND SYSTEM FOR AUTOMATED APPLICATION MANAGEMENT

CROSS-REFERENCE TO RELATED APPLICATIONS

This application claims the benefit of Indian Provisional Patent Application Serial No. 202211022178, filed Apr. 13, 2022, which is hereby incorporated by reference in its entirety.

BACKGROUND

1. Field of the Disclosure

This technology generally relates to methods and systems for managing applications, and more particularly to methods and systems for facilitating application management by automatically deactivating idle applications based on inactivity.

2. Background Information

Many entities operate extensive application networks to facilitate daily business operations. Often, the extensive application networks consume large quantities of compute resources, which are difficult and costly to maintain. Historically, implementations of conventional application management techniques for the application networks have resulted in varying degrees of success with respect to effective and efficient management of idle applications.

One drawback of using the conventional application management techniques is that in many instances, the idle applications are up and running even when there are no activities associated with the idle applications. As a result, the idle applications continue to consume valuable compute resources when not actively in use. Additionally, peripheral services such as, for example, testing services that are associated with the idle applications similarly continue to consume the valuable compute resources.

Therefore, there is a need to provide a smart utility that automatically deactivates an inactive application to save compute resources and automatically activates the inactive application when called upon by a client application.

SUMMARY

The present disclosure, through one or more of its various aspects, embodiments, and/or specific features or sub-components, provides, inter alia, various systems, servers, devices, methods, media, programs, and platforms for facilitating application management by automatically deactivating idle applications based on inactivity.

According to an aspect of the present disclosure, a method for facilitating automated application management based on inactivity is disclosed. The method is implemented by at least one processor. The method may include monitoring at least one metric that corresponds to at least one application, the at least one metric may include a network traffic metric; determining, for each of the at least one application, whether the at least one metric satisfies a predetermined threshold, the predetermined threshold may include an idle time threshold; deactivating the at least one application when the corresponding at least one metric satisfies the predetermined threshold; receiving, from a client application, at least one request for the deactivated at least one application; initiating at least one health check for the at least one application in response to the at least one request; and activating the at least one application based on a result of the at least one health check.

In accordance with an exemplary embodiment, the at least one request from the client application may be authenticated prior to initiating the at least one health check.

In accordance with an exemplary embodiment, the method may further include generating operating state information when the at least one request is received, the operating state information may include data that corresponds to the at least one metric, the predetermined threshold, and the at least one application; associating the operating state information with the at least one request; and persisting the operating state information together with the at least one request for subsequent replay.

In accordance with an exemplary embodiment, to activate the at least one application, the method may further include initiating at least one startup action when the at least one health check satisfies at least one predetermined condition; receiving an indication that the at least one application has been successfully activated, the indication may include at least one application started event; and routing the at least one request to the activated at least one application.

In accordance with an exemplary embodiment, the at least one startup action may include at least one from among an application startup action that activates the at least one application and a peripheral startup action that activates a network environment associated with the at least one application.

In accordance with an exemplary embodiment, the at least one application may be activated in real-time based on the result of the at least one health check in response to the at least one request.

In accordance with an exemplary embodiment, to monitor the at least one metric, the method may further include tracking, via a smart application programming interface, at least one characteristic that corresponds to the at least one application by using the at least one metric, the at least one characteristic may include an idle characteristic as a function of time, wherein the at least one characteristic may relate to at least one from among a current operating state of the at least one application and a past operating state of the at least one application.

In accordance with an exemplary embodiment, the smart application programming interface may correspond to a software interface that operates between the at least one application and an associated server, the software interface may operate as an intermediary layer that processes data transfers.

In accordance with an exemplary embodiment, the predetermined threshold may be adjustable for each of the at least one application via a graphical user interface that is associated with a smart application programming interface.

According to an aspect of the present disclosure, a computing device configured to implement an execution of a method for facilitating automated application management based on inactivity is disclosed. The computing device including a processor; a memory; and a communication interface coupled to each of the processor and the memory, wherein the processor may be configured to monitor at least one metric that corresponds to at least one application, the at least one metric may include a network traffic metric; determine, for each of the at least one application, whether the at least one metric satisfies a predetermined threshold, the predetermined threshold may include an idle time threshold; deactivate the at least one application when the corresponding at least one metric satisfies the predetermined threshold; receive, from a client application, at least one request for the deactivated at least one application; initiate at least one health check for the at least one application in response to the at least one request; and activate the at least one application based on a result of the at least one health check.

In accordance with an exemplary embodiment, the processor may be further configured to authenticate the at least one request from the client application prior to initiating the at least one health check.

In accordance with an exemplary embodiment, the processor may be further configured to generate operating state information when the at least one request is received, the operating state information may include data that corresponds to the at least one metric, the predetermined threshold, and the at least one application; associate the operating state information with the at least one request; and persist the operating state information together with the at least one request for subsequent replay.

In accordance with an exemplary embodiment, to activate the at least one application, the processor may be further configured to initiate at least one startup action when the at least one health check satisfies at least one predetermined condition; receive an indication that the at least one application has been successfully activated, the indication may include at least one application started event; and route the at least one request to the activated at least one application.

In accordance with an exemplary embodiment, the at least one startup action may include at least one from among an application startup action that activates the at least one application and a peripheral startup action that activates a network environment associated with the at least one application.

In accordance with an exemplary embodiment, the processor may be further configured to activate the at least one application in real-time based on the result of the at least one health check in response to the at least one request.

In accordance with an exemplary embodiment, to monitor the at least one metric, the processor may be further configured to track, via a smart application programming interface, at least one characteristic that corresponds to the at least one application by using the at least one metric, the at least one characteristic may include an idle characteristic as a function of time, wherein the at least one characteristic may relate to at least one from among a current operating state of the at least one application and a past operating state of the at least one application.

In accordance with an exemplary embodiment, the smart application programming interface may correspond to a software interface that operates between the at least one application and an associated server, the software interface may operate as an intermediary layer that processes data transfers.

In accordance with an exemplary embodiment, the processor may be further configured to adjust the predetermined threshold for each of the at least one application via a graphical user interface that is associated with a smart application programming interface.

According to an aspect of the present disclosure, a non-transitory computer readable storage medium storing instructions for facilitating automated application management based on inactivity is disclosed. The storage medium including executable code which, when executed by a processor, may cause the processor to monitor at least one metric that corresponds to at least one application, the at least one metric may include a network traffic metric; determine, for each of the at least one application, whether the at least one metric satisfies a predetermined threshold, the predetermined threshold may include an idle time threshold; deactivate the at least one application when the corresponding at least one metric satisfies the predetermined threshold; receive, from a client application, at least one request for the deactivated at least one application; initiate at least one health check for the at least one application in response to the at least one request; and activate the at least one application based on a result of the at least one health check.

In accordance with an exemplary embodiment, when executed by the processor, the executable code may further cause the processor to authenticate the at least one request from the client application prior to initiating the at least one health check.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
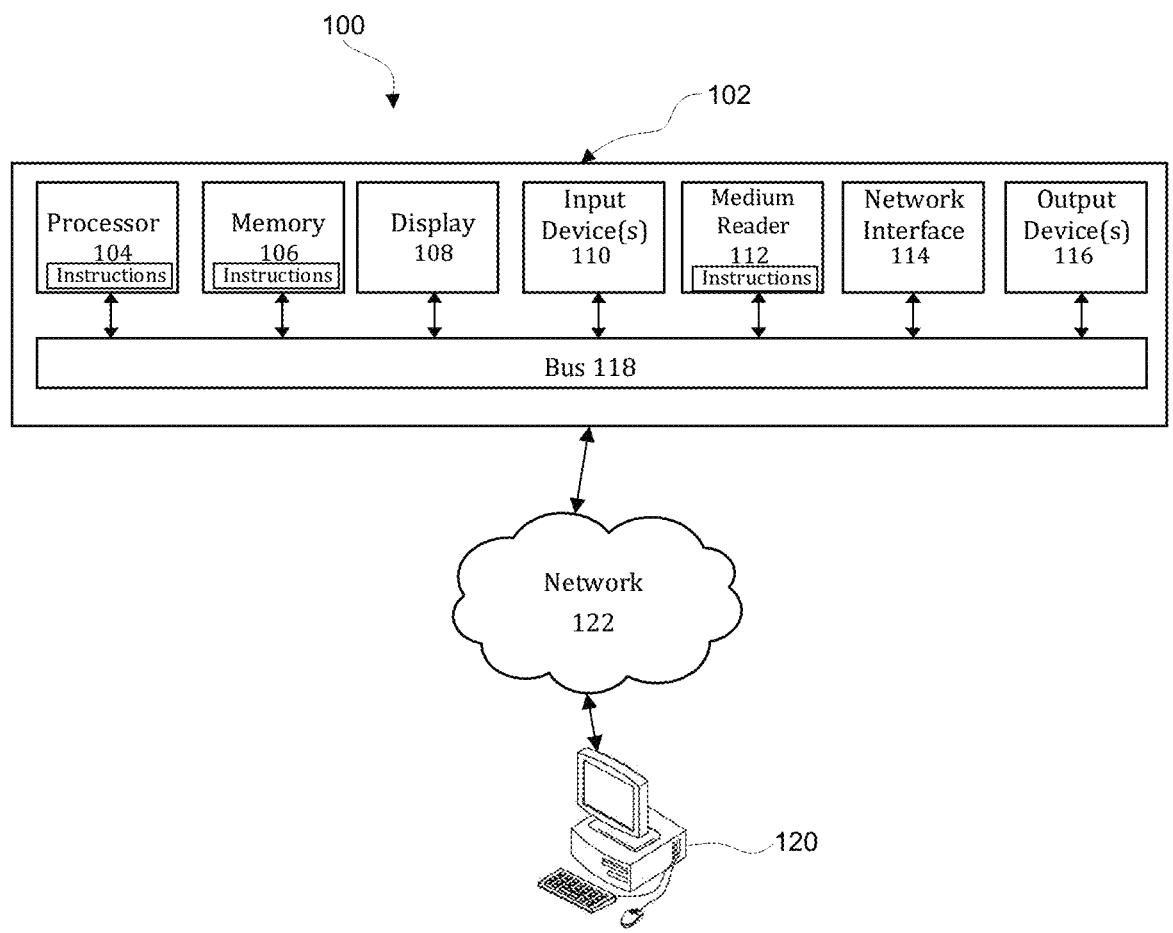
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons of skill in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating application management by automatically deactivating idle applications based on inactivity.

Figure 2:
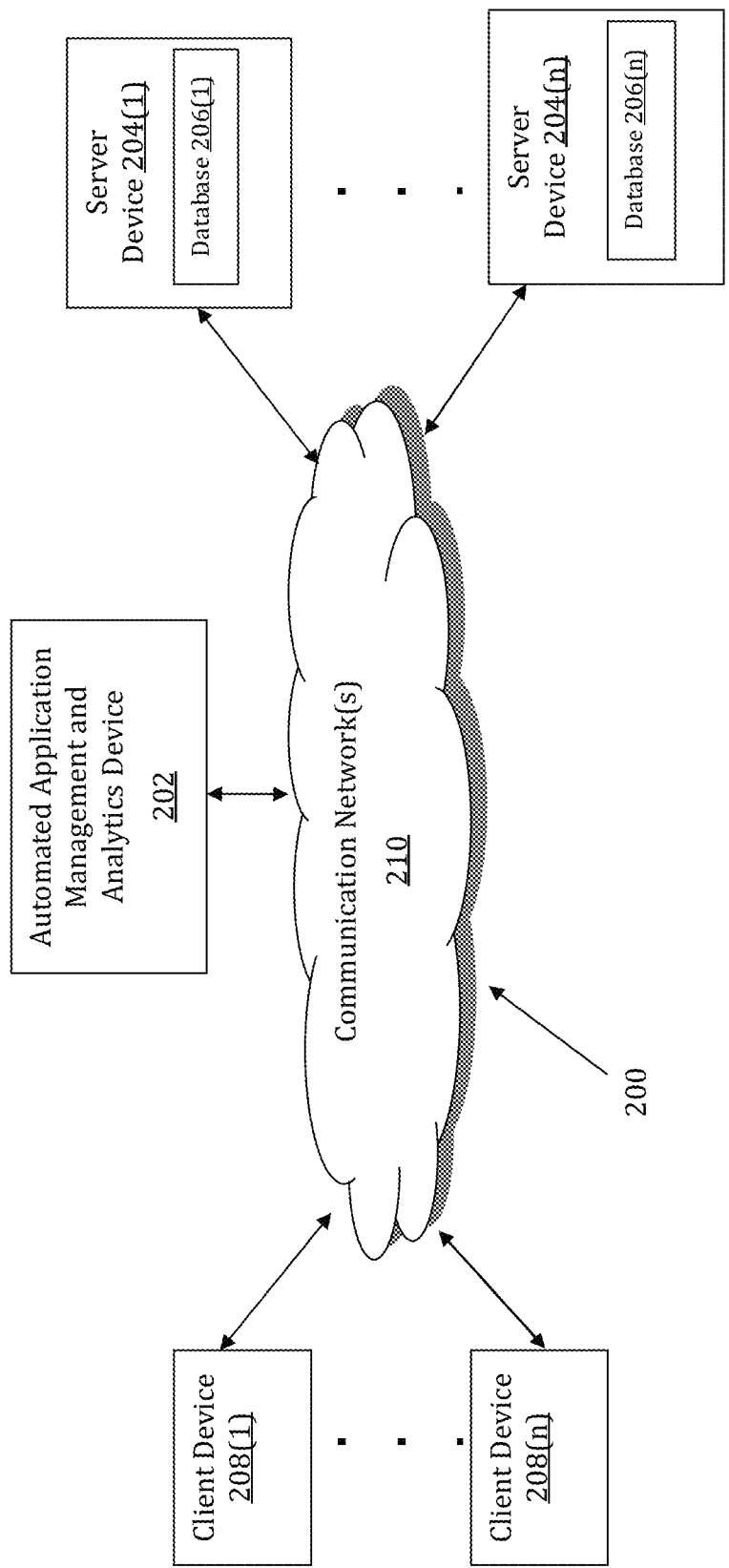
FIG. 2 illustrates an exemplary diagram of a network environment.

Referring to FIG. 2, a schematic of an exemplary network environment 200 for implementing a method for facilitating application management by automatically deactivating idle applications based on inactivity is illustrated. In an exemplary embodiment, the method is executable on any networked computer platform, such as, for example, a personal computer (PC).

The method for facilitating application management by automatically deactivating idle applications based on inactivity may be implemented by an Automated Application Management and Analytics (AAMA) device 202. The AAMA device 202 may be the same or similar to the computer system 102 as described with respect to FIG. 1. The AAMA device 202 may store one or more applications that can include executable instructions that, when executed by the AAMA device 202, cause the AAMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AAMA device 202 itself, may be located in virtual server(s) running in a cloud-based computing environment rather than being tied to one or more specific physical network computing devices. Also, the application(s) may be running in one or more virtual machines (VMs) executing on the AAMA device 202. Additionally, in one or more embodiments of this technology, virtual machine(s) running on the AAMA device 202 may be managed or supervised by a hypervisor.

In the network environment 200 of FIG. 2, the AAMA device 202 is coupled to a plurality of server devices 204(1)-204(n) that hosts a plurality of databases 206(1)-206(n), and also to a plurality of client devices 208(1)-208(n) via communication network(s) 210. A communication interface of the AAMA device 202, such as the network interface 114 of the computer system 102 of FIG. 1, operatively couples and communicates between the AAMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AAMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AAMA devices that efficiently implement a method for facilitating application management by automatically deactivating idle applications based on inactivity.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), or Ethernet-based Packet Data Networks (PDNs), combinations thereof, and the like.

The AAMA device 202 may be a standalone device or integrated with one or more other devices or apparatuses, such as one or more of the server devices 204(1)-204(n), for example. In one particular example, the AAMA device 202 may include or be hosted by one of the server devices 204(1)-204(n), and other arrangements are also possible. Moreover, one or more of the devices of the AAMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the AAMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to metrics, network traffic metrics, predetermined thresholds, idle time thresholds, requests, health checks, operating state information, startup actions, and events.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AAMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AAMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AAMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AAMA device 202, the server devices 204(1)-204(n), or the client devices 208(1)-208(n), for example, may be configured to operate as virtual instances on the same physical machine. In other words, one or more of the AAMA device 202, the server devices 204(1)-204(n), or the client devices 208(1)-208(n) may operate on the same physical device rather than as separate devices communicating through communication network(s) 210. Additionally, there may be more or fewer AAMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
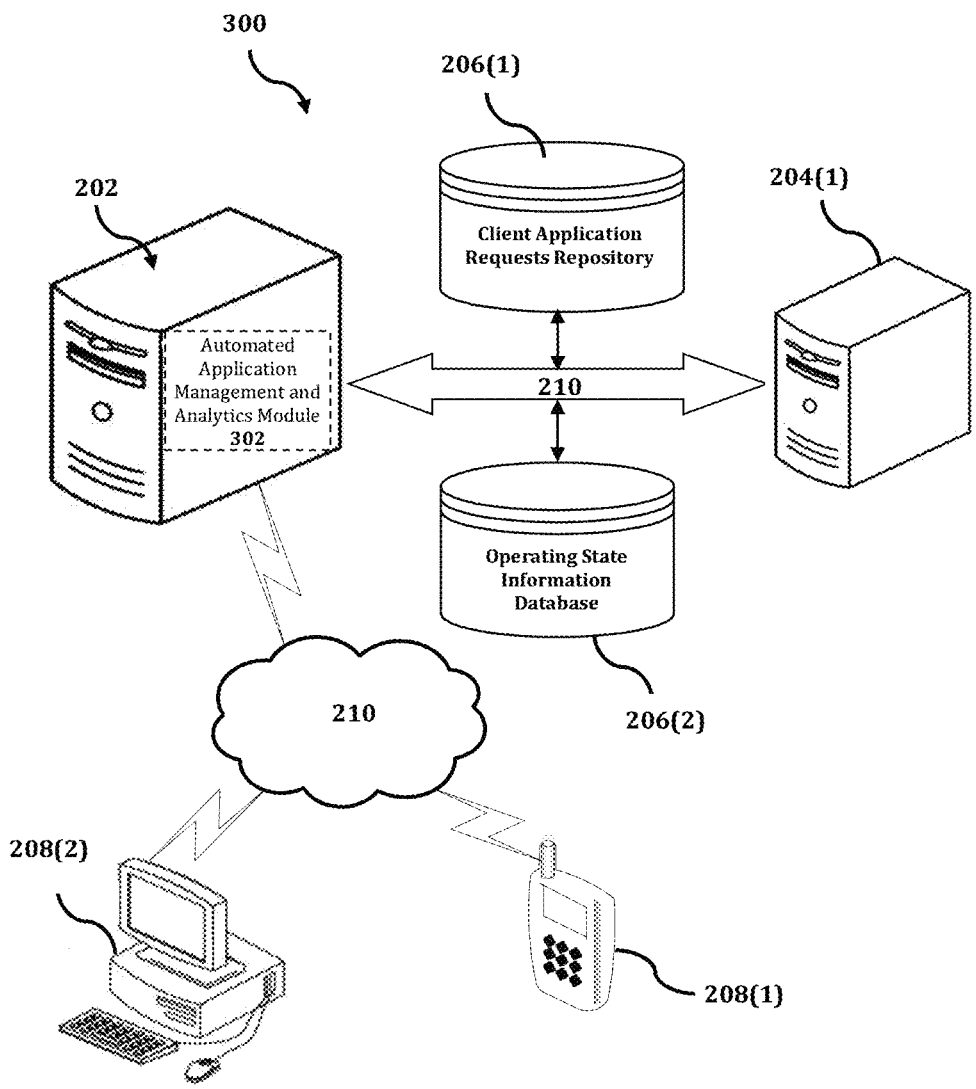
FIG. 3 shows an exemplary system for implementing a method for facilitating application management by automatically deactivating idle applications based on inactivity.

The AAMA device 202 is described and shown in FIG. 3 as including an automated application management and analytics module 302, although it may include other rules, policies, modules, databases, or applications, for example. As will be described below, the automated application management and analytics module 302 is configured to implement a method for facilitating application management by automatically deactivating idle applications based on inactivity.

An exemplary process 300 for implementing a mechanism for facilitating application management by automatically deactivating idle applications based on inactivity by utilizing the network environment of FIG. 2 is shown as being executed in FIG. 3. Specifically, a first client device 208(1) and a second client device 208(2) are illustrated as being in communication with AAMA device 202. In this regard, the first client device 208(1) and the second client device 208(2) may be "clients" of the AAMA device 202 and are described herein as such. Nevertheless, it is to be known and understood that the first client device 208(1) and/or the second client device 208(2) need not necessarily be "clients" of the AAMA device 202, or any entity described in association therewith herein. Any additional or alternative relationship may exist between either or both of the first client device 208(1) and the second client device 208(2) and the AAMA device 202, or no relationship may exist.

Further, AAMA device 202 is illustrated as being able to access a client application requests repository 206(1) and an operating state information database 206(2). The automated application management and analytics module 302 may be configured to access these databases for implementing a method for facilitating application management by automatically deactivating idle applications based on inactivity.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AAMA device 202 via broadband or cellular communication. Of course, these embodiments are merely exemplary and are not limiting or exhaustive.

Upon being started, the automated application management and analytics module 302 executes a process for facilitating application management by automatically deactivating idle applications based on inactivity. An exemplary process for facilitating application management by automatically deactivating idle applications based on inactivity is generally indicated at flowchart 400 in FIG. 4.

Figure 4:
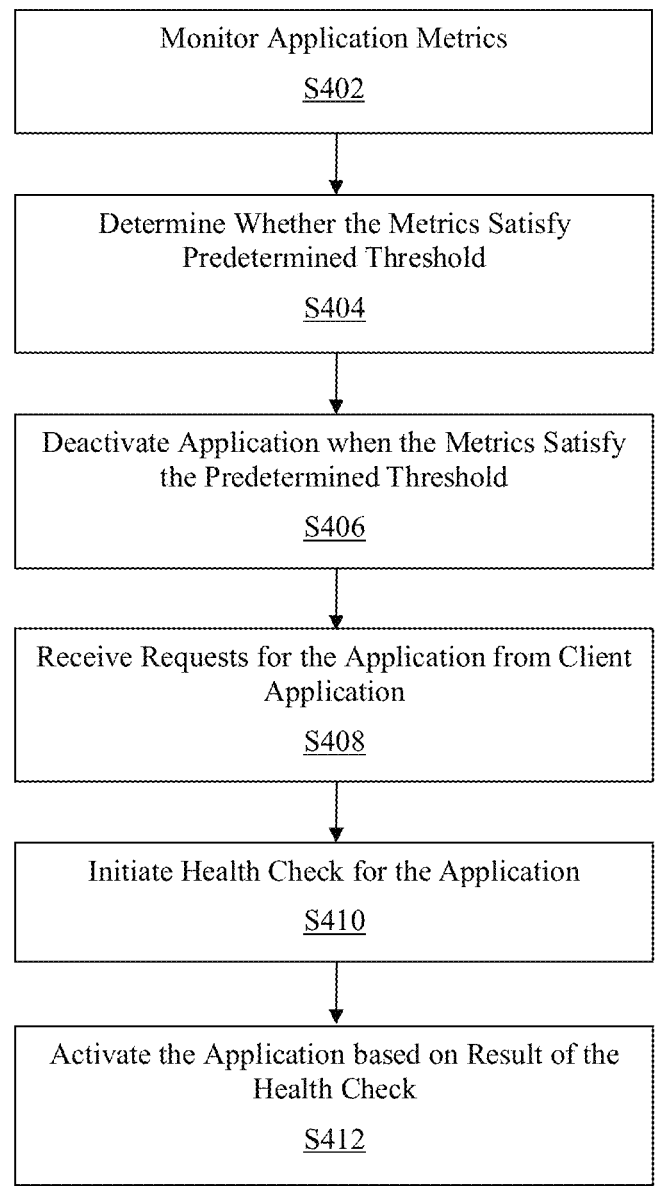
FIG. 4 is a flowchart of an exemplary process for implementing a method for facilitating application management by automatically deactivating idle applications based on inactivity.

In the process 400 of FIG. 4, at step S402, metrics that correspond to an application may be monitored. In an exemplary embodiment, the metrics may include a network traffic metric that relates to activities of the application. The metrics may correspond to information that relates to the application such as, for example, operating information. In another exemplary embodiment, the metrics may be monitored via a smart application programming interface (API) utility that tracks application activity. The smart API may relate to a software interface that serves as a connection between computing components. The smart API may correspond to a software intermediary that enables communication between the computing components by providing definitions and protocols that characterize the communication process.

In another exemplary embodiment, the smart API may sit between the application and a server to act as an intermediary layer that processes data transfers between systems. The smart API may sit outside of the application to enable compatibility and interoperability with any application in any application platform. In another exemplary embodiment, the smart API may access data streams that correspond to the application to enable monitoring of the metrics. The smart API may identify information such as, for example, application activity information and network traffic information from the application data streams.

In another exemplary embodiment, the smart API may track application characteristics such as, for example, an idle characteristic by using the application metrics. The application characteristics may correspond to a current state of the application as well as past states of the application. For example, the application characteristic may indicate that the application is currently idle and has been idle for the past thirty minutes since no activity has been detected for the aforementioned time period.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, the microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, whether the metrics satisfy a predetermined threshold may be determined for the application. In an exemplary embodiment, the predetermined threshold may include an idle time threshold. The idle time threshold may relate to a period of time when no activity is detected for the application. For example, the idle time threshold may correspond to a thirty-minute period of application inactivity. In another exemplary embodiment, the predetermined threshold may correspond to any of the monitored metrics. For example, the predetermined threshold may include a resource consumed threshold.

In another exemplary embodiment, consistent with present disclosures, the smart API may track metrics for the application and determine whether the metrics satisfy the predetermined threshold. The smart API may log the tracked metrics over time to determine whether the metrics satisfy the predetermined threshold. For example, the smart API may track idle time for the application over time to determine that the application has been idle for thirty minutes.

In another exemplary embodiment, the threshold may be predetermined specifically for the application by a user associated with the application. For example, the idle time threshold may be predetermined to be thirty minutes for application A and an hour for application B. In another exemplary embodiment, the threshold may be adjusted by the user via a graphical user interface that is associated with the smart API. The graphical user interface may enable the adjustment of monitored metrics and predetermined thresholds for applications integrated with the smart API.

At step S406, the application may be deactivated when the corresponding metrics satisfy the predetermined threshold. In an exemplary embodiment, the smart API may send a request to stop the application when the predetermined threshold is satisfied. The smart API may invoke tools to identify application information such as, for example, application domain information to facilitate the deactivation process. For example, when the smart API has determined that the application has been idle for more than thirty minutes, the smart API may send a request to stop the application. Consistent with present disclosures, deactivating the application may include stopping application processes as well as stopping peripheral processes such as, for example, application plugins necessary for execution of the application.

At step S408, a request for the deactivated application may be received from a client application. In an exemplary embodiment, the request may relate to a direct request for the application. For example, the request may be specifically directed to application A. In another exemplary embodiment, the request may relate to an indirect request for the application. For example, the request may be specifically directed to application B, which requires processes from application A.

In another exemplary embodiment, the request may be received from the client application via an API gateway. The API gateway may be integrated with the smart API and may be usable to facilitate communication between client applications and requested server applications.

In another exemplary embodiment, the API gateway may dictate the communication between the client applications and the requested server applications by performing administrative functions. The administrative functions may include authenticating the requests from the client application. For example, the API gateway may authenticate requests from the client application to prevent unauthorized access that results in unnecessary activation of a deactivated application.

In another exemplary embodiment, the API gateway may be usable to document the communication between the client applications and the requested applications. To document the communication, the API gateway may generate operating state information when the requests are received. The operating state information may include data that corresponds to the metrics, the predetermined thresholds, and the applications. Then, the API gateway may associate the operating state information with the corresponding request. The API gateway may also persist the operating state information together with the corresponding request to facilitate subsequent replay of an operating condition when the request is received. As will be appreciated by a person of ordinary skill in the art, subsequent replay of operating conditions may enhance troubleshooting capabilities when an error condition is detected.

At step S410, a health check may be initiated for the application in response to the request. In an exemplary embodiment, the health check may be initiated by the API gateway to determine a current state of the application. The current state of the application may include an active state and an inactive state. For example, the health check may determine that the application is in an inactive state when the application has been deactivated. In another exemplary embodiment, the health check may be initiated by the API gateway to determine an operational capability of the application. For example, the health check may be usable to determine whether the application is capable of performing actions requested by the client application.

At step S412, the application may be activated based on a result of the initiated health check. In an exemplary embodiment, the application may be activated by initiating a startup action when the health check satisfies a predetermined condition. The predetermined condition may relate to the current state of the application as well as the operational capability of the application. For example, the startup action may be initiated when the health check indicates that the application is in an inactive state but is otherwise capable of fulfilling the request from the client device.

After initiating the startup action, an indication that the application has been successfully activated may be received. The indication may include an application started event. Then, the requests from the client application may be routed to the activated application consistent with present disclosures.

In another exemplary embodiment, the startup action may include at least one from among an application startup action that activates the application and a peripheral startup action that activates necessary components to facilitate operation of the application. The necessary component may include a network environment that is associated with the application. In another exemplary embodiment, the application may be activated in real-time or near real-time in response to the requests based on the result of the health check. As will be appreciated by a person of ordinary skill in the art, activation of the application includes activation of all necessary components directly and indirectly required for operation of the application.

Figure 5:
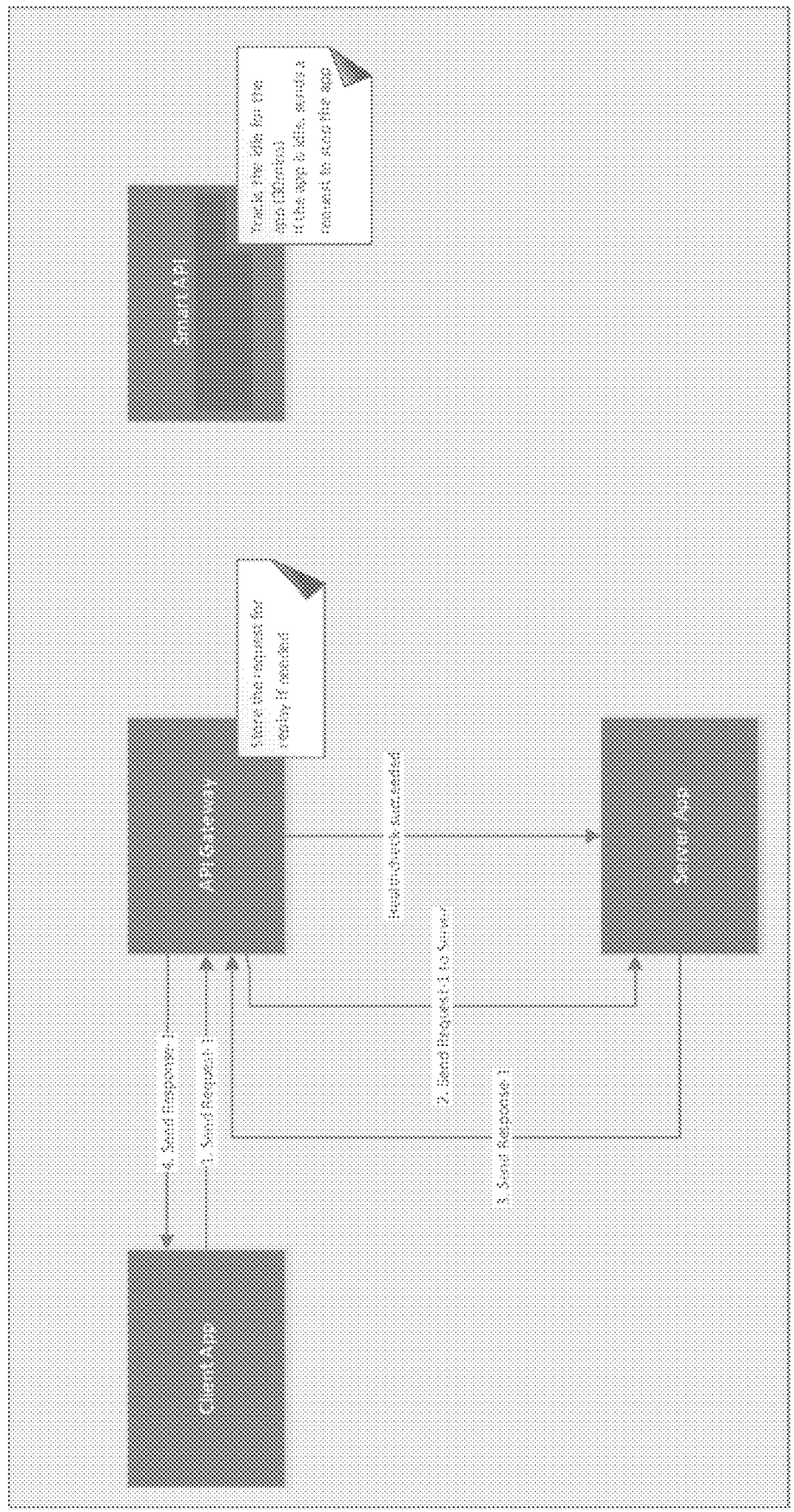
FIG. 5 is a flow diagram of an exemplary health check success process for implementing a method for facilitating application management by automatically deactivating idle applications based on inactivity.

FIG. 5 is a flow diagram 500 of an exemplary health check success process for implementing a method for facilitating application management by automatically deactivating idle applications based on inactivity. In FIG. 5, the successful health check may indicate that the requested server application is in an active state.

As illustrated in FIG. 5, at step 1, the client application sends a request to an API gateway for the server application. Consistent with present disclosures, the API gateway may authenticate the client application request, store the client request for replay when needed, and initiate a health check in the background for the server application. At step 2, when the health check of the server application is successful, the API gateway routes the request to the server application. At step 3, the server application processes the request and sends a response back to the API gateway. Then, at step 4, the API gateway sends the response from the server application to the appropriate client application.

Figure 6:
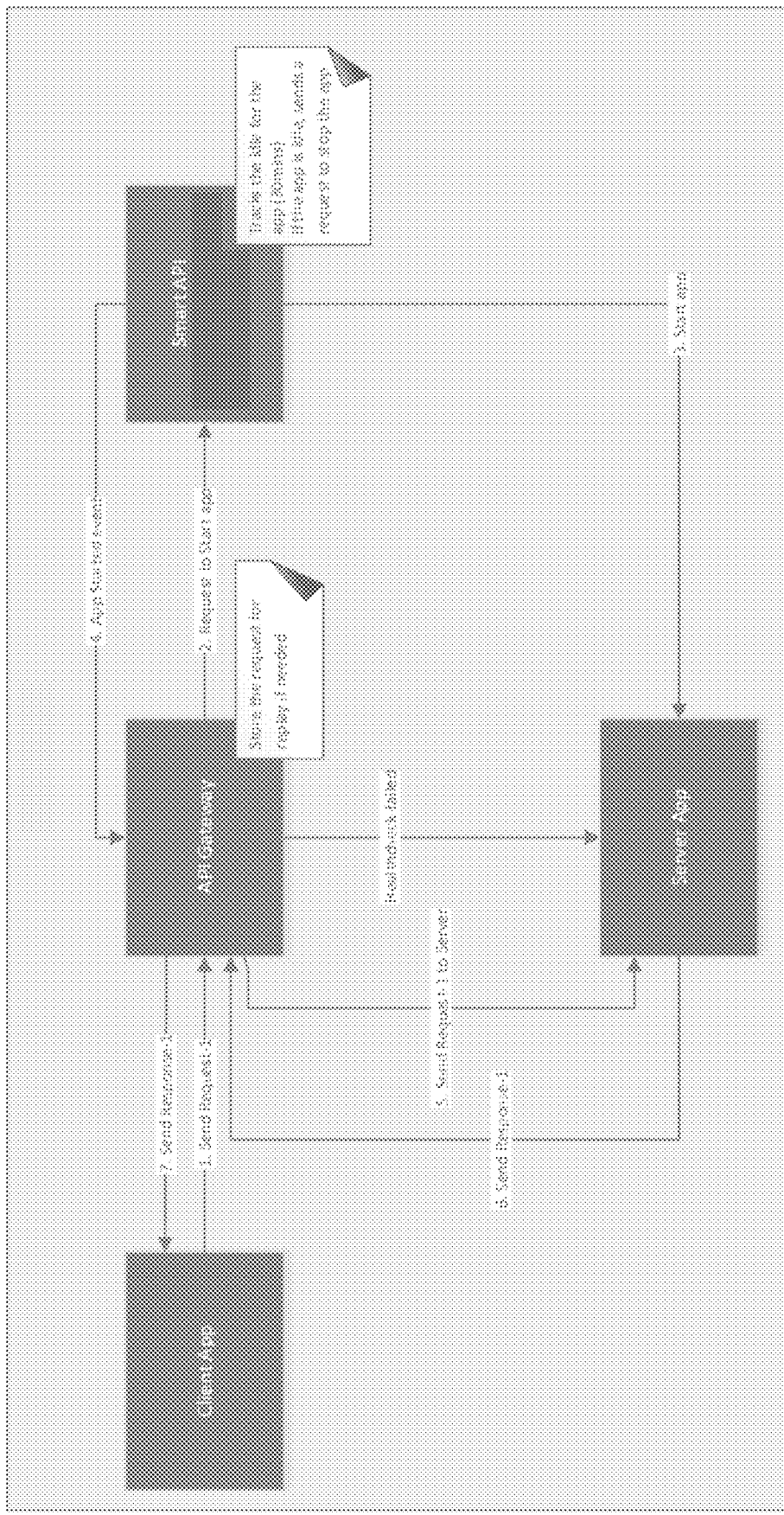
FIG. 6 is a flow diagram of an exemplary health check failure process for implementing a method for facilitating application management by automatically deactivating idle applications based on inactivity.

FIG. 6 is a flow diagram 600 of an exemplary health check failure process for implementing a method for facilitating application management by automatically deactivating idle applications based on inactivity. In FIG. 6, the failed health check may indicate that the requested server application is in an inactive state.

As illustrated in FIG. 6, at step 1, the client application sends a request to an API gateway for the server application. Consistent with present disclosures, the API gateway may authenticate the client application request, store the client request for replay when needed, and initiate a health check in the background for the server application. At step 2, when the health check of the server application is unsuccessful, the API gateway sends a request to the smart API to start the server application. Then, at step 3, the smart API starts the server application.

At step 4, when the server application has been stated, the smart API sends an application started event back to the API gateway. At step 5, upon receipt of the application started event, the API gateway routes the request to the server application. At step 6, the server application processes the request and sends a response back to the API gateway. Then, at step 7, the API gateway sends the response from the server application to the appropriate client application.

Figure 7:
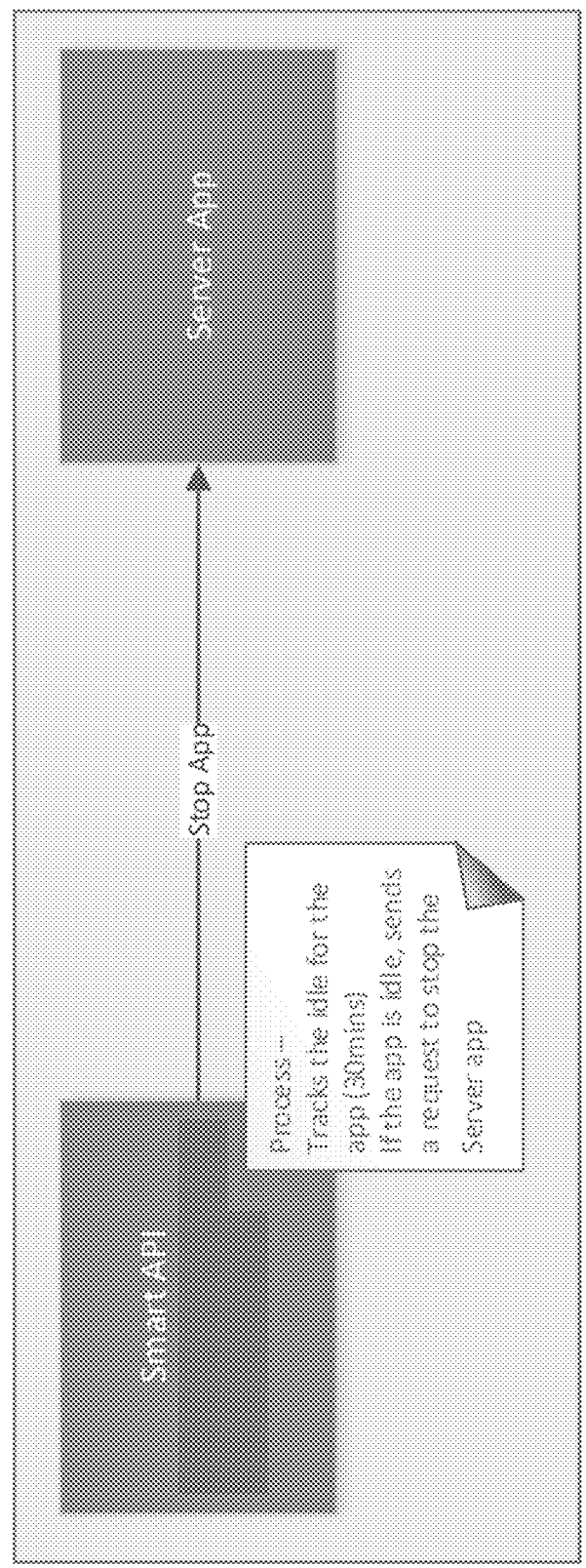
FIG. 7 is a flow diagram of an exemplary application monitoring process for implementing a method for facilitating application management by automatically deactivating idle applications based on inactivity.

FIG. 7 is a flow diagram 700 of an exemplary application monitoring process for implementing a method for facilitating application management by automatically deactivating idle applications based on inactivity.

As illustrated in FIG. 7, the smart API may be integrated with the server application via a communication interface consistent with disclosures in the present application. The smart API may correspond to a process that tracks the idle time for the server application. When an idle time threshold such as, for example, a thirty-minute idle threshold is reached, the smart API may send a request to stop the server application. Consistent with present disclosures, stopping the server application may also include stopping necessary peripheral processes such as, for example, application plugins that are necessary for operation of the server application.

Accordingly, with this technology, an optimized process for facilitating application management by automatically deactivating idle applications based on inactivity is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated application management based on inactivity, the method being implemented by at least one processor, the method comprising:
monitoring, by the at least one processor, at least one metric that corresponds to at least one application, the at least one metric including a network traffic metric;
determining, by the at least one processor for each of the at least one application, whether the at least one metric satisfies a predetermined threshold, the predetermined threshold including an idle time threshold;
automatically deactivating, by the at least one processor, the at least one application when the corresponding at least one metric satisfies the predetermined threshold;
receiving, by the at least one processor from a client application, at least one request for the deactivated at least one application;
initiating, by the at least one processor, at least one health check for the at least one application in response to the at least one request; and
activating, by the at least one processor, the at least one application based on a result of the at least one health check.

2. The method of claim 1, wherein the at least one request from the client application is authenticated prior to initiating the at least one health check.

3. The method of claim 1, further comprising:
generating, by the at least one processor, operating state information when the at least one request is received, the operating state information including data that corresponds to the at least one metric, the predetermined threshold, and the at least one application;
associating, by the at least one processor, the operating state information with the at least one request; and
persisting, by the at least one processor, the operating state information together with the at least one request for subsequent replay.

4. The method of claim 1, wherein activating the at least one application further comprises:
initiating, by the at least one processor, at least one startup action when the at least one health check satisfies at least one predetermined condition;
receiving, by the at least one processor, an indication that the at least one application has been successfully activated, the indication including at least one application started event; and
routing, by the at least one processor, the at least one request to the activated at least one application.

5. The method of claim 4, wherein the at least one startup action includes at least one from among an application startup action that activates the at least one application and a peripheral startup action that activates a network environment associated with the at least one application.

6. The method of claim 1, wherein the at least one application is activated in real-time based on the result of the at least one health check in response to the at least one request.

7. The method of claim 1, wherein monitoring the at least one metric further comprises:
tracking, by the at least one processor via a smart application programming interface, at least one characteristic that corresponds to the at least one application by using the at least one metric, the at least one characteristic including an idle characteristic as a function of time,
wherein the at least one characteristic relates to at least one from among a current operating state of the at least one application and a past operating state of the at least one application.

8. The method of claim 7, wherein the smart application programming interface corresponds to a software interface that operates between the at least one application and an associated server, the software interface operating as an intermediary layer that processes data transfers.

9. The method of claim 1, wherein the predetermined threshold is adjustable for each of the at least one application via a graphical user interface that is associated with a smart application programming interface.

10. A computing device configured to implement an execution of a method for facilitating automated application management based on inactivity, the computing device comprising:
a processor,
a memory; and
a communication interface coupled to each of the processor and the memory,
wherein the processor is configured to:
monitor at least one metric that corresponds to at least one application, the at least one metric including a network traffic metric;
determine, for each of the at least one application, whether the at least one metric satisfies a predetermined threshold, the predetermined threshold including an idle time threshold;
automatically deactivate the at least one application when the corresponding at least one metric satisfies the predetermined threshold;
receive, from a client application, at least one request for the deactivated at least one application;
initiate at least one health check for the at least one application in response to the at least one request; and
activate the at least one application based on a result of the at least one health check.

11. The computing device of claim 10, wherein the processor is further configured to authenticate the at least one request from the client application prior to initiating the at least one health check.

12. The computing device of claim 10, wherein the processor is further configured to:
generate operating state information when the at least one request is received, the operating state information including data that corresponds to the at least one metric, the predetermined threshold, and the at least one application;
associate the operating state information with the at least one request; and
persist the operating state information together with the at least one request for subsequent replay.

13. The computing device of claim 10, wherein, to activate the at least one application, the processor is further configured to:
initiate at least one startup action when the at least one health check satisfies at least one predetermined condition;
receive an indication that the at least one application has been successfully activated, the indication including at least one application started event; and
route the at least one request to the activated at least one application.

14. The computing device of claim 13, wherein the at least one startup action includes at least one from among an application startup action that activates the at least one application and a peripheral startup action that activates a network environment associated with the at least one application.

15. The computing device of claim 10, wherein the processor is further configured to activate the at least one application in real-time based on the result of the at least one health check in response to the at least one request.

16. The computing device of claim 10, wherein, to monitor the at least one metric, the processor is further configured to:
track, via a smart application programming interface, at least one characteristic that corresponds to the at least one application by using the at least one metric, the at least one characteristic including an idle characteristic as a function of time,
wherein the at least one characteristic relates to at least one from among a current operating state of the at least one application and a past operating state of the at least one application.

17. The computing device of claim 16, wherein the smart application programming interface corresponds to a software interface that operates between the at least one application and an associated server, the software interface operating as an intermediary layer that processes data transfers.

18. The computing device of claim 10, wherein the processor is further configured to adjust the predetermined threshold for each of the at least one application via a graphical user interface that is associated with a smart application programming interface.

19. A non-transitory computer readable storage medium storing instructions for facilitating automated application management based on inactivity, the storage medium comprising executable code which, when executed by a processor, causes the processor to:
monitor at least one metric that corresponds to at least one application, the at least one metric including a network traffic metric;
determine, for each of the at least one application, whether the at least one metric satisfies a predetermined threshold, the predetermined threshold including an idle time threshold;
automatically deactivate the at least one application when the corresponding at least one metric satisfies the predetermined threshold;
receive, from a client application, at least one request for the deactivated at least one application;
initiate at least one health check for the at least one application in response to the at least one request; and
activate the at least one application based on a result of the at least one health check.

20. The storage medium of claim 19, wherein, when executed by the processor, the executable code further causes the processor to authenticate the at least one request from the client application prior to initiating the at least one health check.

* * * * *